INVENTORS
ROBERT (NMI) LEVINE
KENNETH C. H. STOCKHOFF
BY [signature]
[signature]
ATTORNEYS Aug. 4, 1970 R. LEVINE ET AL 3,522,539

SYSTEM FOR DEMODULATING DIGITAL DATA INFORMATION CONTAINED IN FREQUENCY SHIFT KEYED SIGNALS

Filed Aug. 8, 1967 2 Sheets-Sheet 2

INVENTORS
ROBERT (NMI) LEVINE
KENNETH C.H. STOCKHOFF

BY [signatures]

ATTORNEYS

United States Patent Office 3,522,539

Patented Aug. 4, 1970

3,522,539

SYSTEM FOR DEMODULATING DIGITAL DATA INFORMATION CONTAINED IN FREQUENCY SHIFT KEYED SIGNALS

Robert Levine, Agoura, and Kenneth C. H. Stockhoff, Canoga Park, Calif., assignors, by mesne assignments, to the United States of America as represented by the Secretary of the Navy Filed Aug. 8, 1967, Ser. No. 659,237
Int. Cl. H04l *27/10*
U.S. Cl. 325—320 9 Claims

ABSTRACT OF THE DISCLOSURE

In a demodulator for a frequency shift keying communication system, signals are produced which are representative of positive-going and negative-going zero crossings of the received signal, integrating means combine the outputs of pulse sources over a period equal to one bit time of the digital data, and an amplitude gate samples the zero crossings of the integrated signal to produce a square wave output having zero crossings commensurate with the sampled zero crossings of the integrated signal.

The present invention is concerned with a demodulator or data terminal for a frequency shift keying communication system and more particularly is directed to a data terminal or demodulator which is especially adapted to convert a frequency shift keyed signal into a form for conveniently processing digital data information contained in such signal.

Generally speaking, the purpose of a digital data communication system is to transfer data between remote data processing equipments. Most such systems provide two way digital data communication and basically a system will consist of data link transmitters, appropriate communication facilities, and data link receivers which are interposed between the data processing equipments. Each data link transmitter conventionally consists of a converter and a modulator. The converter performs the function of converting the data processing equipment output signals to a form required by the modulator. The modulator then converts these signals to a form suitable for transmission over the communication facilities to the site of the remote data processing equipment. Accordingly, a data link receiver generally may consist of a demodulator and a converter which converts the transmitted signals to a form required by the receiving data processing equipment.

Generally, the choice of modulation technique employed in a particular data communication system is dependent upon (1) the characteristics of the communications facilities and (2) the required data transmission speed. A 1200 bit-per-second digital arrangement operating over a radio link between a ground station and an aircraft is a typical example of a system in which the data terminal or demodulator of the present invention may be employed.

The basic function of converters in such a system is to furnish additional data processing capability required to render the data communication system compatible with data processing equipment. Examples of desirable converter capabilities are, to function as line buffers to satisfy interface requirements; to provide parallel-to-serial conversion of transmitted messages; to provide the converse serial-to-parallel conversion of received messages; to provide a suitable data rate conversion for both transmitted and received messages; to provide multiplexing in order to couple several data link transmitters and receivers to a single output or input channel in a data processing equipment; to provide a means for the insertion of parity information into the transmitted messages; to provide appropriate checking of parity information contained in the received messages; to make adequate provision for the addition of any auxiliary bits required for the transmission of messages; and to afford the convenient deletion of any auxiliary bits contained in received messages.

Yet another most important converter function is found in the case of a special purpose data processing equipment designed expressly for data transmission. Such a data processor should have the capability of transmitting and receiving data at the rates and in the format required for compatibility with modulators and demodulators. Since the data processor could perform all of the converter functions, the need for a separate converter apparatus is eliminated. Such modulators and demodulators may then be directly connected to the data processing equipment. The data terminal equipment or demodulator of the present invention is concerned with this latter type of system.

In such a system, the modulators convert digital data from a binary form supplied by the data processing equipment to a modulated carrier suitable for transmission over radio communications facilities. Additionally, the modulators may provide appropriate output impedance required to match the radio communication facilities and at selectively adjustable output level.

The demodulators of such systems operate to convert the digital data from the modulator carrier form received from the communications facilities to an appropriate binary form required by the data processing equipment at the receiving station. Additionally, such demodulators may provide a suitable input impedance required to match the terminal impedance of the communication facilities as well as preferably a wide dynamic operating range.

For maximum performance of such a data transmission system the demodulated or detected signal is sampled midway between transitions. Required timing information is most conveniently derived from the location of transitions in the detected signal itself and this method requires that transitions occur often enough to maintain synchronism. Accordingly, the data terminal equipment or demodulator preferably includes means designed and arranged to accept the received and detected signal for purposes of generating an appropriate synchronizing signal.

It is a primary object of the present invention to provide an improved data terminal or demodulator for receiving a frequency shift keyed signal containing digital data information.

An equally important object of the present invention is to provide such a data terminal or demodulator which is adapted to convert received signals to a form required by data processing equipment thereby eliminating the need for a separate converter equipment.

Yet another important object of the present invention is to provide an improved data terminal or demodulator having a wide dynamic operating range and appropriate impedance matching characteristics.

A further object of the present invention is to provide an improved data terminal or demodulator for a frequency shift keying communications system which is inherently more simple in concept than known prior art systems.

A concomitant object of the present invention is to provide such an improved data terminal or demodulator which is adaptable to fabrication in small, lightweight equipments.

A still further object of the present invention is to provide a data terminal or demodulating equipment of the type described which is especially adapted to operate in data communication links involving aircraft as remote receiving stations.

In its most fundamental form the data terminal or demodulator of the present invention, which is employed in a frequency shift keying communication system, may comprise an appropriate means for receiving a frequency shift keyed signal containing digital data information; in a preferred embodiment such receiving means may include a transformer for purposes of D–C isolation and a bandpass filter for restricting the input noise to a minimum while passing desired signal components. A fixed attenuator may be connected between the transformer and the bandpass filter in order to provide the bandpass filter with isolation and the proper source impedance so that the amplitude and phase characteristics of the filter are maintained through the passband regardless of driving force impedance variations.

A "slicer" or first amplitude gate is connected to receive the frequency shift keyed signal, which amplitude gate is operative to produce signals representative of positive-going and negative-going zero crossings of the received signal. Accordingly, the first amplitude gate produces an output which comprises selceted portions of the received signal above and below a zero axis of that signal.

The output of the first amplitude gate is connected to first and second monostable pulse sources, the first monostable pulse source being responsive to positive-going zero crossings for producing pulses and the second monostable pulse source being responsive to negative-going zero crossings for producing pulses. An integrating means is connected to receive the resultant pulse outputs of both of the pulse sources for integrating the combined pulse signals over a period of time which is substantially equal to one bit time of the digital data contained in the received frequency shift keyed signal. The output of the integrating means is connected as the input to a second amplitude gate which, in effect, samples the zero crossings of the integrated sginal for producing an output of substantially square wave form having zero crossings commensurate with the sampled zero crossings of the integrated signal.

In a preferred embodiment of the present invention a synchronizer is connected to receive the output of the demodulator or data terminal; the synchronizer operates to generate timing pulses spaced at the center of each bit of the digital data. The output of the synchronizer is preferably connected to the receiving data processing equipment together with the output of the data terminal or demodulator and provides a means of appropriate synchronization at the receiving data terminal of the system.

These and other features, advantages, and objects of the present invention will be better understood from the following description of an embodiment of the present invention together with the accompanying drawings and the scope of the invention will be pointed out in the appended claims.

Figure 1:
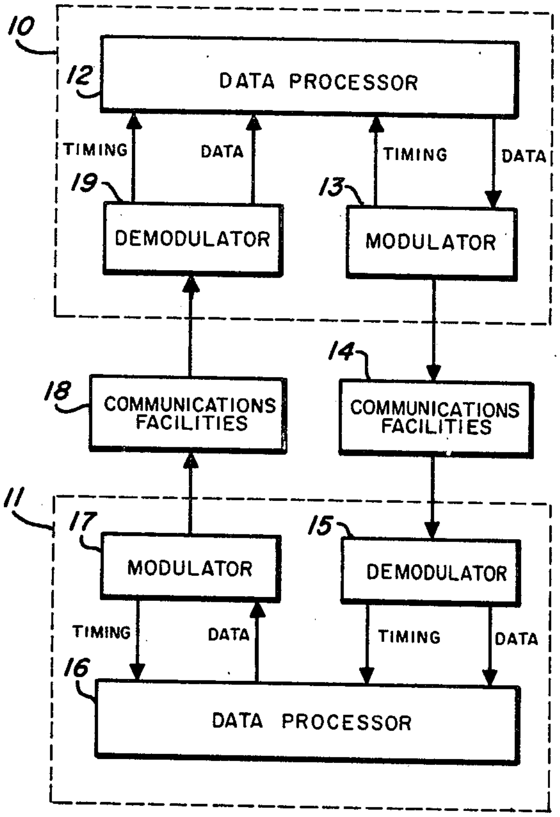
FIG. 1 is a schematic block diagram illustrating a digital data communication link.

FIG. 1 schematically illustrates a two way, ground-to-air-to-ground communication link of the type which may include the data terminal or demodulator assembly of the present invention. The communication link may comprise a ground station 10 and an airborne data terminal 11. Within the ground station 10 is included a data processor 12 which may comprise a computer or other appropriate data processing equipment. The data processor 12 is connected to a modulator 13 of a general type which will be described in more detail hereinafter.

The modulator provides an output to communication facilities represented at 14 which may be radio transmissions received by a demodulator 15 at the airborne data terminal 11. The demodulator 15 processes the received signals to provide both data and timing inputs to a data processor 16 which similarly may comprise digital computation or other appropriate data equipment.

The data processor 16, in turn, provides data output to a modulator 17 which produces an output for transmission through communications facilities such as radio link as represented at 18. The modulated transmitted intelligence is received at the ground station 10 by a demodulator 19 which provides both data and timing input to the data processor 12.

As was previously explained, the concept of the present invention is such that an analog-to-digital converter is not required since the modulator performs that function.

In order to better understand and correlate the significance of the present invention, it is believed desirable that the manner in which the frequency shift keyed signal received by the data terminal or demodulator of the present invention is developed before being transmitted across an appropriate communications link be explained in some detail.

Figure 2:
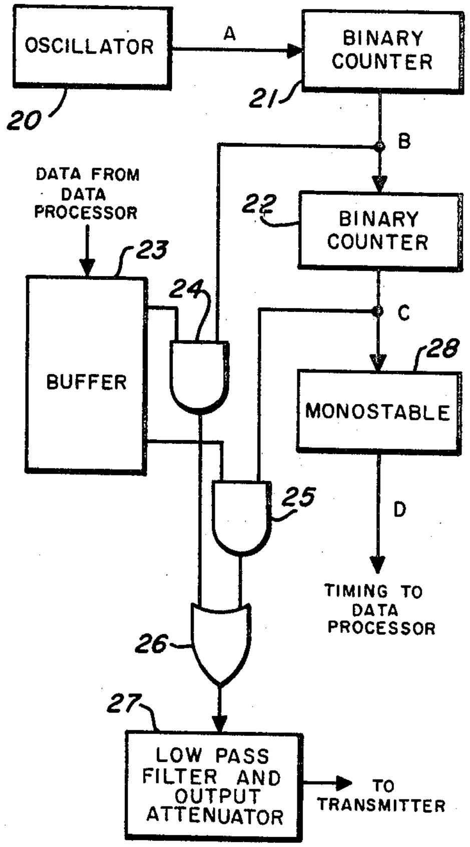
FIG. 2 is a schematic block diagram illustrating a modulator of the frequency shift keying type.

FIG. 2 illustrates a typical frequency shift keying modulator which is employed for the purpose of incorporating digital data information in a transmitted signal in the form of frequency shift keyed waveforms. A source of fixed frequency oscillations is provided as illustrated at 20. Typically, such source of oscillations may be a fixed oscillator producing an output of 4.8 kilocycles per second as illustrated by waveform A of FIG. 3.

The output of the oscillator 20 is connected to a binary counter 21 which performs the function of a frequency divider, dividing the oscillator output by a factor of two so that the output of the binary counter 21 is 2.4 kilocycles. This frequency is substantially in the shape of a square wave as illustrated by the waveform B of FIG. 3 and may be called the "space" frequency.

Figure 3:
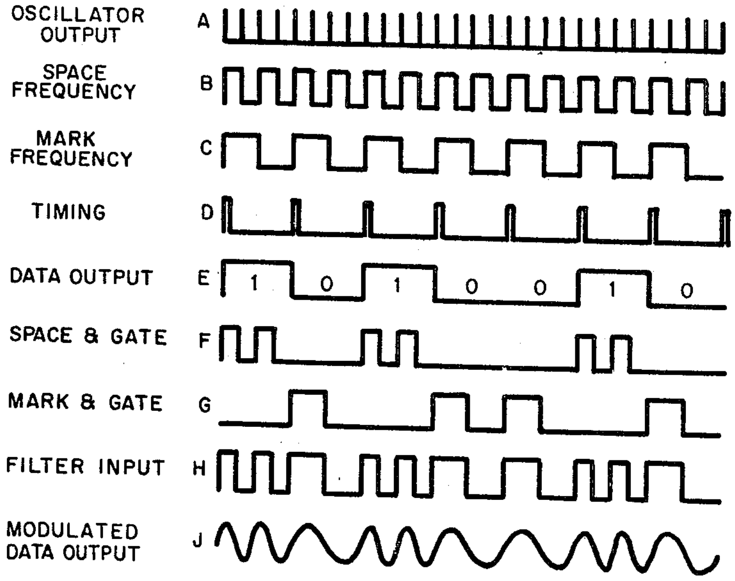
FIG. 3 is a graphic illustration of the type of waveform signals developed in the modluator of FIG. 2.

The output of the binary counter 21 is fed to a second binary counter 22 where it is again divided by a factor of two to produce an output frequency of 1.2 kilocycles having a substantially square waveform such as that represented by the waveform C of FIG. 3, which may be referred to as the "mark" frequency.

Both the outputs of the binary counter 21 and the binary counter 22 are combined with data input in a logic circuit shown in the lower portion of FIG. 2. The logic circuit of AND gates 24 and 25 together with OR gate 26 are arranged to respond to data input impressed upon the data processor and passed through a buffer 23. The gates 24, 25 and 26 operate so that a binary "1" will produce a signal of the mark frequency, i.e., 1.2 kilocycles squarewave as represented by waveform C of FIG. 3, or a binary code "0" as represented by the space frequency illustrated by waveform B of FIG. 3.

The combined output passes through OR gate 26 and is received by a low pass filter and output attenuator 27 which limits the resultant signal to the voice bandwidth of the transmitter for which it develops an input signal. The binary counter 22, producing an output signal of 1.2 kilocycles is connected to a monostable circuit 28 which generates output pulses of the character and frequency shown in waveform D of FIG. 3, which timing pulses are connected to the data processor from which the initial digital data is received.

Assuming that the digital data is of the character shown and illustrated by waveform E of FIG. 3, it will be seen that there is represented a binary "1," then a binary "0," followed by a binary "1," then two binary "0's" an additional binary "1" and finally a binary "0," in that order. Accordingly, the digital data signal of waveform E received by the gate 24 from the buffer 23 together with the 2.4 kilocycles space frequency squarewave output of binary counter 21 will produce a signal of the character shown by waveform G of FIG. 3. Similarly, the digital data received by the gate 25 from the buffer 23 together with the mark frequency of 1.2 kilocycles generated by the binary counter 22 will produce an output of the character of the waveform F in FIG. 3. These two latter described signals, i.e., the space indications and mark indications are combined in an OR gate 26 to provide the input to the filter 27 and the general character of the composite waveform of the combined signals is shown by waveform H of FIG. 3.

The lowpass filter and output attenuator 27 operates upo nthe squarewave input which it receives in the form of waveform H to produce an output substantially of the character of waveform J as shown in FIG. 3. This is the frequency shift keyed signal representative of the digital data it is desired to transmit over the communication link.

The transmitter frequency shift keyed signal containing digital data information is transmitted as by radio, for instance, from a ground station to an airborne data terminal as previously described in connection with the explanation of the operation of the apparatus illustrated in FIG. 1.

Figure 4:
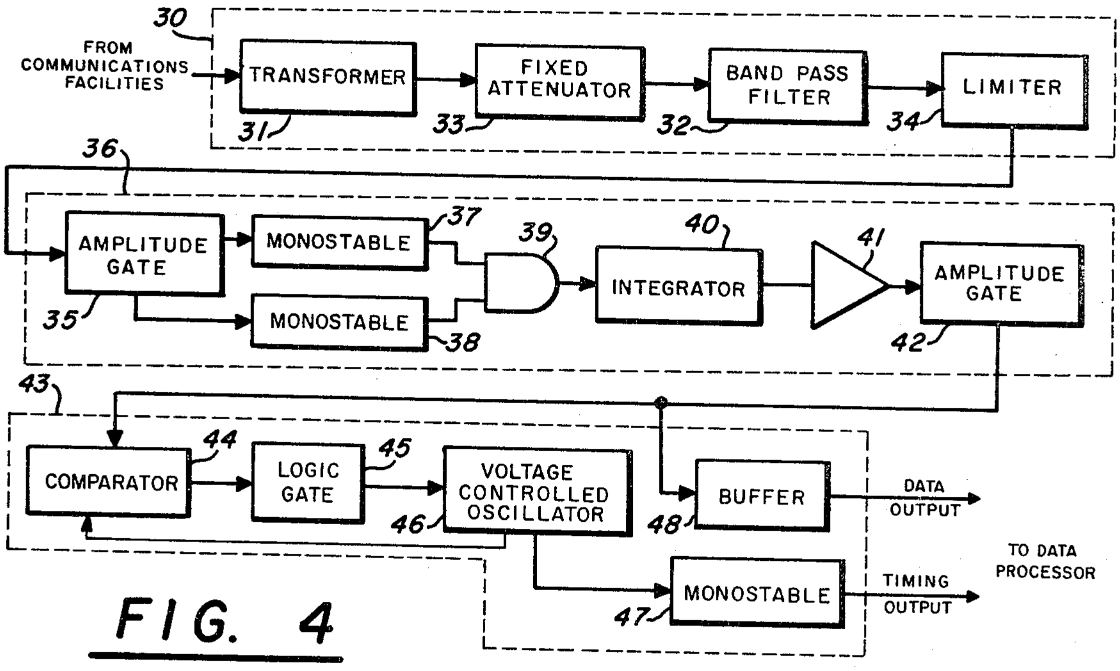
FIG. 4 is a schematic block diagram of an embodiment of the present invention in the form of a frequency shift keyed demodulator or data terminal.

The data terminal or demodulator operates to convert the frequency shift keyed signal to its original digital data form. FIG. 4 is a schematic block diagram showing a preferred embodiment of the present invention comprising such a data terminal or demodulator equipment. As illustrated in FIG. 4, the demodulator of the present invention includes a receiving means for receiving a frequency shift keyed signal containing digital data information. Such signal is received from the communications facilities which may, for instance, be in the form of a radio link between a ground station and an airborne data terminal as previously described. The receiving means 30 of the present invention may comprise a transformer 31 which provides D-C isolation and a bandpass filter 32 which restricts the input noise spectrum to a minimum while passing desired signal components. A fixed attenuator 33 may be connected between the transformer 31 and the bandpass filter 32 of the receiving means 33 to provide the bandpass filter with isolation and also a proper source impedance so that the amplitude and phase characteristics of the bandpass filter are maintained throughout the passband regardless of variations in the driving source impedance. The bandpass filter is designed with special attention to a lineal phase response within the desired passband in order to minimize signal degradation due to delay distortion.

The output of the bandpass filter is shown as being connected to a limiter circuit 34 which performs the function of providing a suitable dynamic operating range which in a typical apparatus may be of the order of 30 db, for example. The output of limiter 34 is connected to an amplitude gate 35, sometimes referred to as a "slicer," which samples the limited version of the input signal about the zero crossings.

Figures 5, 6:
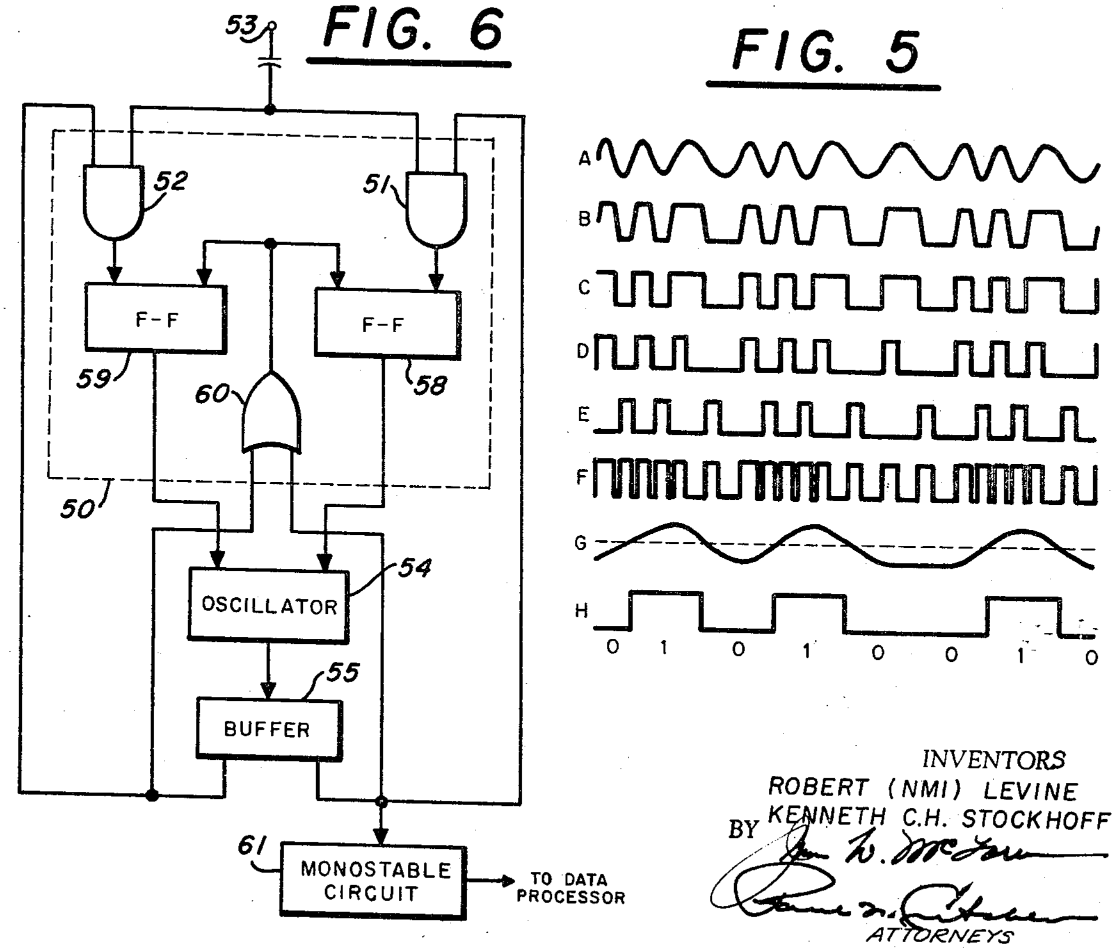
FIG. 5 is a graphic illustration of a type of waveform signals which may be developed in the embodiment of FIG. 4.
FIG. 6 is a schematic block diagram showing details of the type of synchronizer which may be included in the data terminal apparatus of the present invention.

The operation of the portion of the demodulator or data terminal equipment thus far described is illustrated as to configuration of the signals received and developed by the waveforms included in FIG. 5. The frequency shift keyed signal containing digital data information is illustrated by waveform A of FIG. 5 which it will be noted is substantially the same as waveform J of FIG. 3, i.e., the modulated data output of the signal transmitted across the data link facilities. The receiving means 30 as illustrated in FIG. 4 receives the waveform of the configuration shown by waveform A of FIG. 5 and converts it to a form substantially as illustrated by waveform B of FIG. 5. It will be noted that this signal is a limited version of almost squarewave configuration.

The signal of configuration as in waveform B is fed to the amplitude gate 35 of the detector equipment indicated generally at 36 and produces a signal output of the general character illustrated by waveform C of FIG. 5. This waveform is fed to two monostable pulse sources 37 and 38 which in a preferred embodiment will produce pulses of identical character. The two monostable pulse sources 37 and 38 are arranged so that one is responsive to positive-going zero crossings of the received input signal to develop commensurate output pulses, while the other monostable pulse source is responsive to negative-going zero crossings of its input signal to produce commensurate output pulses.

Thus, the monostable pulse source 37 which may be responsive to positive-going zero crossings to produce a commensurate output signal, will produce a pulse output signal substantially in the configuration and of the character shown by waveform D of FIG. 5; the monostable pulse source 38, being responsive to negative-going zero crossings of its input signal in the form of waveform C of FIG. 5, produces commensurate pulse outputs of the character shown and illustrated by waveform E of FIG. 5.

Both the pulse outputs are fed to a gate 39 to produce an aggregate pulse signal of the type and configuration illustrated by waveform F of FIG. 5. The aggregate pulse signal fed to the lowpass filter 40 produces an output of the type illustrated by waveform G of FIG. 5, performing an integrating function upon its input signal over a period substantially equal to one "bit" time of the digital data contained in the originally received frequency shift keyed signal.

The output of integrator 40 is appropriately amplified in an amplifier 41 which provides the input to a second amplitude gate 42. The second amplitude gate 42 is responsive to zero crossings of its input signal in the form of the waveform E of FIG. 5 to produce a commensurate substantially squarewave output of the character illustrated in waveform H in FIG. 5. It will be seen by comparison of waveform G and H of FIG. 5 that the integrated waveform G has the same zero crossings about a zero level indicated by the dash line as the zero crossings represented in the squarewave of waveform H.

By comparison of waveform H of FIG. 5 and the data input waveform E of FIG. 3 it will be seen that the original input data has been reconstructed at the data terminal or demodulator so that the same serial digital data is represented by waveform H as originally comprised the input to the system in the form of the digital data of waveform E of FIG. 3. It should be noted that this system is capable of operating over communications facilities that exhibit ferquency translation such as high frequency single sideband systems.

The output signal in the form of waveform H, containing the desired binary data information is buffered appropriately to provide an input to the data processing equipment or computer at the receiving station, which as previously mentioned, may be an airborne receiving station.

The binary data signal output also may be employed as the input to a synchronizer which generates timing for the data processing or computer equipment at the receiving or terminal station. The lower portion of FIG. 4 illustrates such a synchronizer as contained within the dashed line block at 43. Briefly, the function of the synchronizer may be described as the generation of timing pulses located at the center of each bit of the binary data information. The synchronizer operates on transitions in the data signal which comprises its input to determine whether each timing pulse is early or late. This is achieved in the comparator 44 and an appropriately controlled logic gate 45 operates to control a voltage controlled oscillator 46 which in turn controls a monostable pulse source 47 to generate the timing output signals fed to a data processing equipment or computer.

FIG. 6 illustrates in more detail the circuitry and operation of the synchronizer 43 as shown in schematic block diagram FIG. 4. The comparator 50 includes gates 51 and 52 both of which are connected to receive the digital data input received at input terminal 53 from the detector 36 of the data terminal equipment. Second inputs are provided to gates 51 and 52 from a source of oscillations such as the voltage control oscillator 54 connected through the buffer 55 and appropriate connections 56 and 57.

In operation, two flip-flops 58 and 59 are actuated by the outputs of the gates 51 and 52, respectively, to operate as control elements for the oscillator 54. When the timing pulse is early as received through the gate 60 and one of the inputs to a flip-flop 58, flip-flop 58 is set "true." Similarly, when the timing pulse is late as received by flip-flop 59, flip-flop 59 is set "true." The outputs of the flip-flops 58 and 59 are then used to determine when the next oscillator transition should occur.

A flip-flop within the buffer circuit 55 is used both to count down the oscillator frequency produced by the oscillator 54, and to serve as a reference in determining if the timing pulse is late or early. Due to the harmonic relationships of the frequency oscillator 54 and the bit rate, if the timing pulse is to be late, then the flip-flop in the buffer circuit 55 will be "true" when the data makes the transition. Conversely, the flip-flop of the buffer 55 will be "true" when the pulse is to be early. Thus, the appropriate flip-flop can be set and the oscillator will be in effect commanded to correct the lack of synchronism for producing timing pulses occurring at the center of each bit of binary data information. The monostable circuit 61 is used to shape the timing signal into a narrow pulse such as that suitable for use by the data processing equipment or computer to which it is fed for synchronizing purposes.

It is to be appreciated by those skilled in the art that the concept of the present invention provides a data terminal or demodulator equipment which is inherently simple and facilitates its implementation and embodiment in desirably small equipments. Moreover, the inherent simplicity of the concept renders it substantially lighter in weight than known prior art demodulators and data terminals of comparable performance characteristics, so that it is especially well suited to airborne installations. Additionally, it would be apparent to those skilled in the art that the present invention is such that may be readily implemented in a desirable solid state embodiment.

Performing as it does, both the function of demodulator and convertor, the present invention provides an equipment which eliminates the requirement for a converter separate from and addition to the necessary demodulator equipment.

In addition to these and other advantages and features, the present invention provides an equipment which may be implemented in a desirably compact package suitable for air airborne data terminal, as well as having a desirably wide dynamic operating range, reliability of operation and appropriate impedance matching characteristics as between the input impedance of such equipment and the terminal impedance of communication facilities employed in data communications systems of this kind.

What is claimed is:

1. A demodulator for a frequency shift keying communication system comprising:

means for receiving a frequency shift keyed signal containing digital data information;

a first amplitude gate connected to receive said frequency shift keyed signal, said gate being operative to produce signals representive of positive-going and negative-going zero crossings of said received signal;

first and second monostable pulse sources connected to receive the output signals of said first amplitude gate, said first monostable pulse source being responsive to positive-going zero crossings and said second monostable pulse source being responsive to negative-going zero crossings;

an integrating means connected to receive the pulse outputs of said pulse sources for integrating the combined pulse outputs over a period substantially equal to one bit time of said digital data;

a second amplitude gate connected to sample the zero crossings of the output of said integrating means, for producing an output of substantially square wave form having zero crossings commensurate with said sampled zero crossings;

a synchronizer having a signal source of a frequency harmonically related to the bit rate of said digital data and adapted to be controllably variable about said frequency, said synchronizing including a comparator connected to receive the output of said second amplitude gate and the output of said signal source, and operatively connected with a logic means responsive to the relative disposition in time of the signals received by said comparator for producing an output signal commensurate with said relative disposition;

means connecting the output signal of said logic means to said signal source for varying the frequency responsive to the relative time disposition of the compared signals;

a monostable signal source responsive to the output of said signal source for generating a pulsed output synchronized with the data bit rate of said data signals; and means for connecting the output of said second amplitude gate and said synchronized pulsed output to a data processing means for synchronously processing said data.

2. A demodulator as claimed in claim 1 wherein said monostable pulse sources comprise multivibrator circuits.

3. A demodulator as claimed in claim 2 wherein said multivibrator circuits produce pulses of substantially the same width and amplitude.

4. A demodulator as claimed in claim 1 wherein said integrating means comprises a low pass filter.

5. A demodulator as claimed in claim 1 wherein said means for receiving the frequency shift keyed signal containing digital data information includes a bandpass filter adapted to restrict input noise and pass desired signal components.

6. A demodulator as claimed in claim 5 wherein said bandpass filter has substantially linear phase response in the passband.

7. A demodulator as claimed in claim 6 wherein said means for receiving frequency shift keyed signal includes D-C isolation means.

8. A demodulator as claimed in claim 7 including an attenuator connected between said D-C isolation means and said bandpass filter for isolating said filter and providing an appropriate source impedance.

9. A demodulator as claimed in claim 1 including a synchronizer connected to receive the output of said demodulator for generating timing pulses spaced substantially at the center of each bit of said digital data.

References Cited

UNITED STATES PATENTS

| | | | |
|---|---|---|---|
| 2,904,683 | 9/1959 | Meyer | 329—128 |
| 3,233,181 | 2/1966 | Calfee | 178—66 XR |
| 3,341,782 | 9/1967 | Aemmes | 178—66 XR |

ROBERT L. GRIFFIN, Primary Examiner

R. S. BELL, Assistant Examiner

U.S. Cl. X.R.

178—66, 88; 329—126